(12) United States Patent
Melandri et al.

(10) Patent No.: US 10,843,414 B2
(45) Date of Patent: Nov. 24, 2020

(54) UNIT AND METHOD FOR FORMING/ADVANCING A PACK OR A PORTION OF A PACK

(71) Applicant: Tetra Laval Holdings & Finance S.A., Pully (CH)

(72) Inventors: Antonio Melandri, Rubiera (IT); Stefano Rossi, Reggio Emilia (IT); Vittoria Lanza, Gazzo Veronese (IT); Davide Borghi, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/308,066

(22) PCT Filed: Jun. 1, 2017

(86) PCT No.: PCT/EP2017/063341
§ 371 (c)(1),
(2) Date: Dec. 7, 2018

(87) PCT Pub. No.: WO2017/211688
PCT Pub. Date: Dec. 14, 2017

(65) Prior Publication Data
US 2019/0308375 A1 Oct. 10, 2019

(30) Foreign Application Priority Data

Jun. 9, 2016 (EP) ..................... 16173633

(51) Int. Cl.
*B29C 65/00* (2006.01)
*B65B 9/20* (2012.01)
(Continued)

(52) U.S. Cl.
CPC .......... *B29C 66/9672* (2013.01); *B29C 65/02* (2013.01); *B29C 65/74* (2013.01);
(Continued)

(58) Field of Classification Search
CPC ........ B29C 66/91231; B29C 66/91421; B29C 66/967; B29C 66/9672; B29C 66/9674; B65B 51/30; B65B 51/306
See application file for complete search history.

(56) References Cited

U.S. PATENT DOCUMENTS 6,625,517 B1 * 9/2003 Bogdanov ............... B29C 65/02
324/207.21
2006/0049250 A1 3/2006 Sullivan
(Continued)

FOREIGN PATENT DOCUMENTS

| EP | 0887269 A1 | 12/1998 |
|---|---|---|
| WO | WO 00-75603 A1 | 12/2000 |
| WO | WO 2006-068999 A2 | 6/2006 |

OTHER PUBLICATIONS

International Search Report and Written Opinion in corresponding PCT Application No. PCT/EP2017/063341 dated Aug. 2, 2017 (13 pages).

*Primary Examiner* — George R Koch
(74) *Attorney, Agent, or Firm* — Finnegan, Henderson, Farabow, Garrett & Dunner LLP

(57) ABSTRACT

There is described a unit (1) for forming/advancing at least one pack (3) or at least one portion of a pack 5 (3), comprising: a frame (12a, 12b), at least one carriage (14, 14b), which is movable along a path (13a, 13b) with respect to frame (12a, 12b) and is adapted to form/advance said pack (3) or said at least one portion of a pack (3), an electromagnetic stationary device 10 (50), at least one tag (52a, 52b) carried by carriage (14a, 14b), and wireless communication means (51) configured to establish a bidirectional communication between stationary device (50) and tag (52a, 52b).

9 Claims, 2 Drawing Sheets

(51) Int. Cl.

| | |
|---|---|
| *B65B 65/00* | (2006.01) |
| *B65B 51/30* | (2006.01) |
| *B29C 65/74* | (2006.01) |
| *B29C 65/02* | (2006.01) |
| *B65B 57/00* | (2006.01) |
| *B29L 31/00* | (2006.01) |
| *B65B 55/10* | (2006.01) |
| *B65B 9/207* | (2012.01) |
| *B65B 51/10* | (2006.01) |

(52) U.S. Cl.
CPC ...... *B29C 66/1122* (2013.01); *B29C 66/4312* (2013.01); *B29C 66/72321* (2013.01); *B29C 66/72328* (2013.01); *B29C 66/73921* (2013.01); *B29C 66/8244* (2013.01); *B29C 66/82263* (2013.01); *B29C 66/8351* (2013.01); *B29C 66/849* (2013.01); *B29C 66/91231* (2013.01); *B29C 66/95* (2013.01); *B29C 66/9674* (2013.01); *B65B 9/2014* (2013.01); *B65B 51/306* (2013.01); *B65B 57/00* (2013.01); *B65B 65/00* (2013.01); *B29C 66/71* (2013.01); *B29L 2031/7166* (2013.01); *B65B 9/207* (2013.01); *B65B 55/103* (2013.01); *B65B 2051/105* (2013.01)

(56) References Cited

U.S. PATENT DOCUMENTS

| | | | |
|---|---|---|---|
| 2006/0145863 A1* | 7/2006 | Martin | B65D 79/02 340/572.8 |
| 2011/0088351 A1 | 4/2011 | Zeiler et al. | |
| 2014/0346009 A1* | 11/2014 | Pedrazzini | B65G 47/46 198/367 |

* cited by examiner

UNIT AND METHOD FOR FORMING/ADVANCING A PACK OR A PORTION OF A PACK

CROSS-REFERENCE TO RELATED PATENT APPLICATIONS

This is a National Phase of International Application No. PCT/EP2017/063341, filed Jun. 1, 2017, which claims the benefit of European Application No. 16173633.5 filed Jun. 9, 2016. The entire contents of the above-referenced applications are expressly incorporated herein by reference.

TECHNICAL FIELD

The present invention relates to a unit and a method for forming/advancing a pack or a portion of a pack.

In particular, the packs are adapted to be filled with pourable food product, are sealed and are formed starting from a tube of packaging material. The portions of the packs are, in particular, opening devices.

BACKGROUND OF INVENTION

As is known, many liquid or pourable food products, such as fruit juice, UHT (ultra-high-temperature treated) milk, wine, tomato sauce, etc., are sold in packages made of sterilized packaging material.

A typical example is the parallelepiped-shaped package for liquid or pourable food products known as Tetra Brik Aseptic (registered trademark), which is made by creasing and sealing laminated strip packaging material. The packaging material has a multilayer structure comprising a base layer, e.g. of paper, covered on both sides with layers of heat-seal plastic material, e.g. polyethylene. In the case of aseptic packages for long-storage products, such as UHT milk, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Packages of this sort are normally produced on fully automatic packaging units, on which a continuous tube is formed from the web-fed packaging material; the web of packaging material is sterilized on the packaging unit, e.g. by applying a chemical sterilizing agent, such as a hydrogen peroxide solution, which, once sterilization is completed, is removed from the surfaces of the packaging material, e.g. evaporated by heating; the web so sterilized is then maintained in a closed, sterile environment, and is folded and sealed longitudinally to form a tube, which is fed along a vertical advancing direction.

In order to complete the forming operations, the tube is filled with the sterilized or sterile-processed food product, and is sealed and subsequently cut along equally spaced transversal cross sections.

Pillow packs are so obtained, which have a longitudinal sealing band, and a top transversal sealing band and a bottom transversal sealing band.

Recently, independently self-movable carriages have been widely applied for conveying packages or opening devices in the packaging industry.

In greater detail, each carriage substantially comprises a respective movable element which is movable along a path and is generally provided with a gripping element. The carriages are magnetically coupled with a stationary magnetic field source, so as to be advanced along the path by the magnetic force associated to the magnetic field.

In particular, it has been proposed, in the embodiment shown in FIG. 17 of WO00/64741, a packaging unit adapted to interact with the tube to heat-seal it at equally spaced cross sections and to form a plurality of pillow packs connected to the tube by transversal sealing bands crosswise to the advancing axis of the tube.

The packaging unit comprises:
a first track and a second track, which are arranged on respective opposite lateral sides of the tube; and
a plurality of first carriages self-movable on the first track and a plurality of respective second carriages self-movable on the second track.

In particular, the first carriages are movable independently from each other along the first track and the second carriages are movable independently from each other along the second track.

Each first carriage is fitted with a relative sealing element and a relative half-shell, while each corresponding second carriage is fitted with a respective counter-sealing element and with a relative half-shell.

Carriages are also used in devices for applying glue onto opening device before gluing the latter onto the formed and filled packages.

A further application of carriages can be found in the direct moulding of opening devices onto respective holes or so-called "pre-laminated holes" of the web of packaging material. According to this technique, carriages are employed for setting respective molding stations in desired positions on the web of packaging material. The molding stations are then operated to inject the respective opening devices.

A need is felt within the industry to acquire some data associated to the operative conditions of the carriages or of the unit, e.g. temperature and/or acceleration values, during the operation of the carriages themselves.

DISCLOSURE OF INVENTION

It is therefore an object of the present invention to provide a unit for forming/advancing a pack or a portion of a pack, which meets the above-identified needs.

According to the present invention, there is provided a unit for forming/advancing a pack or a portion of a pack, as claimed in claim 1.

The present invention also relates to a method for forming/advancing a pack or a portion of a pack.

BRIEF DESCRIPTION OF THE DRAWINGS

One preferred, non-limiting embodiment of the present invention will be described by way of example with reference to the accompanying drawings, in which.

DETAILED DESCRIPTION OF PREFERRED EMBODIMENTS

Figure 1:
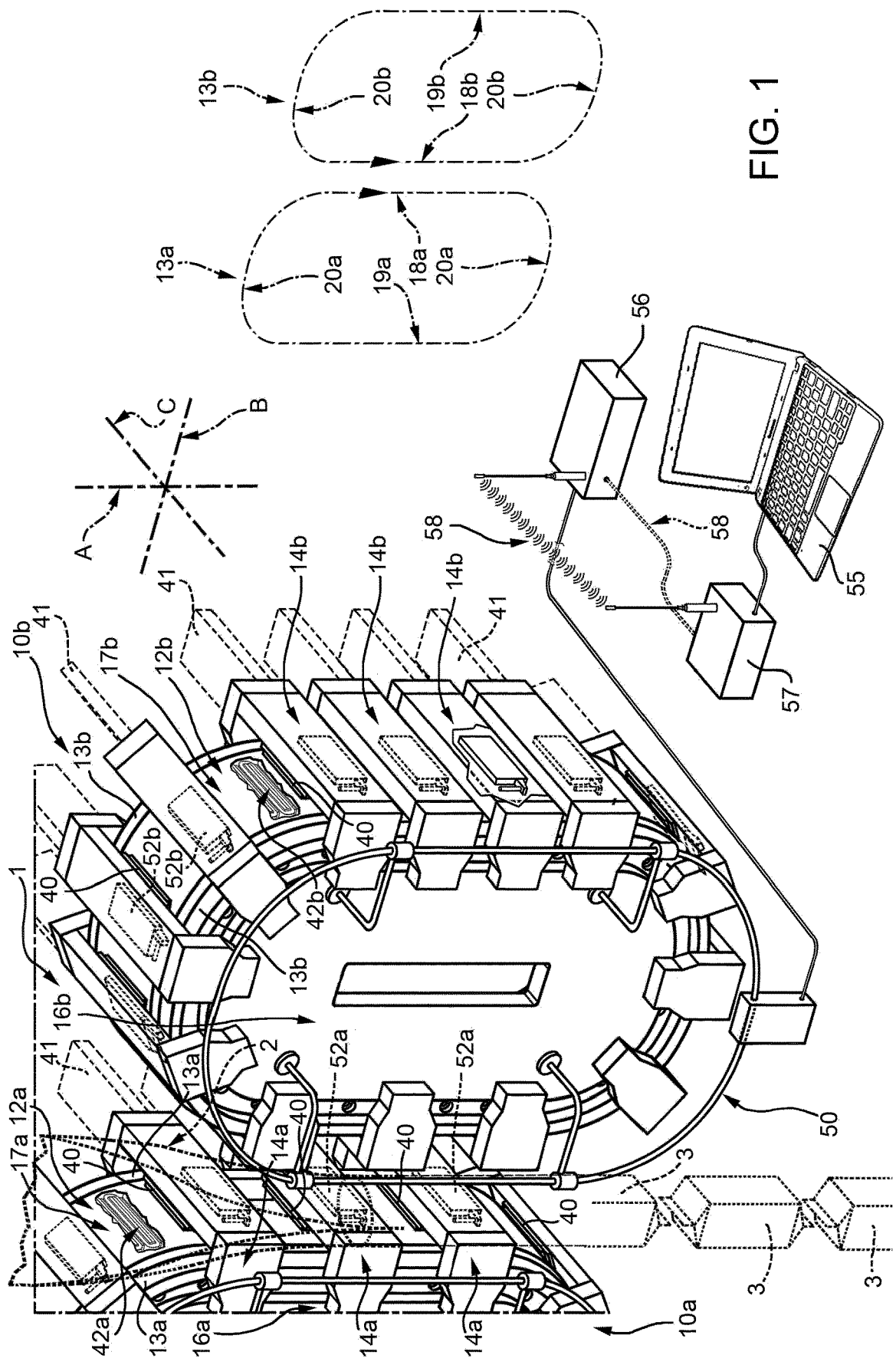
FIG. 1 is a perspective view of a unit for forming/advancing a pack or a portion of a pack in accordance with the present invention.
Figure 2:
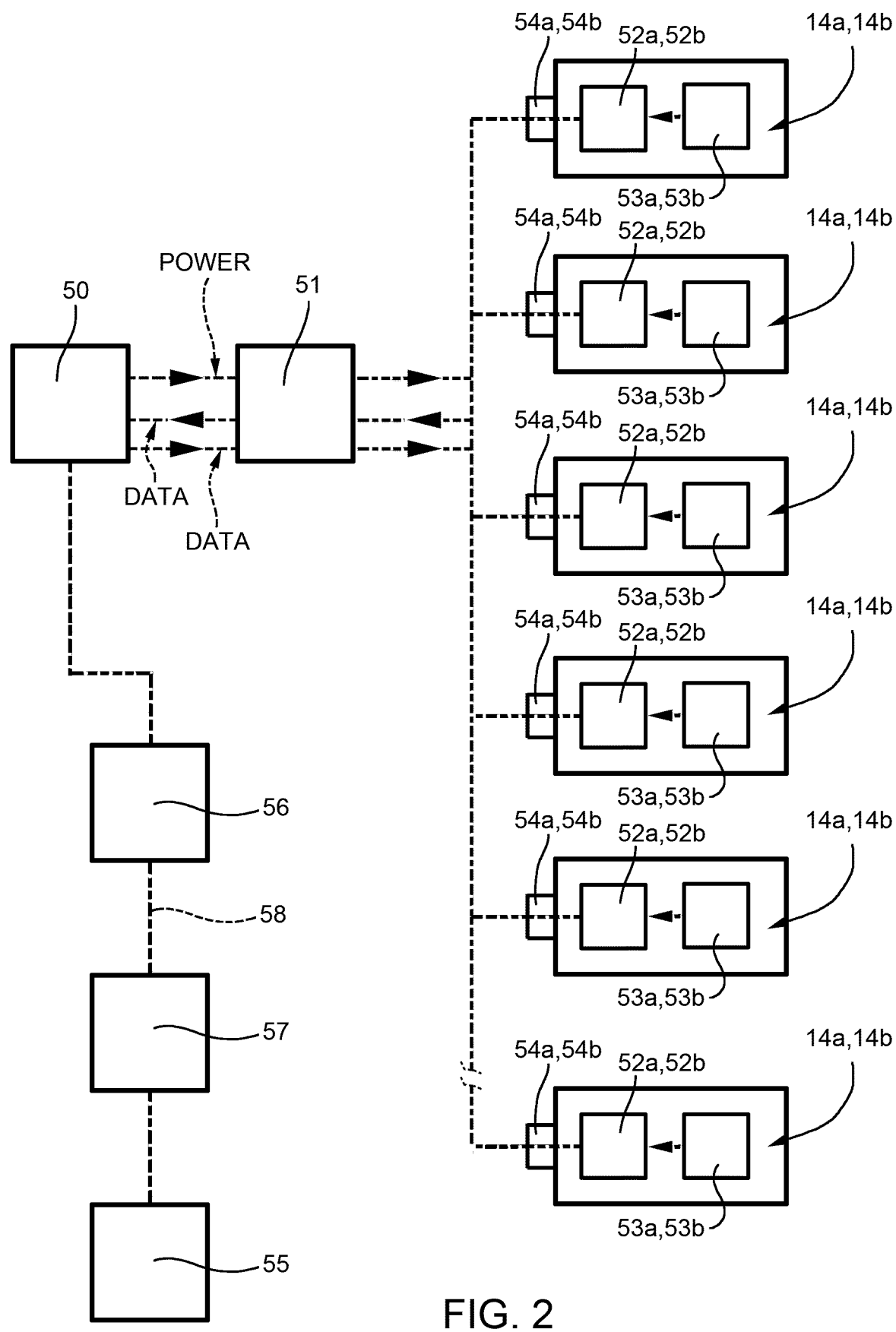
FIG. 2 is a schematic view of some components of the unit of FIG. 1.

With reference to FIGS. 1 and 2, number 1 indicates a unit generally intended for advancing at least one sealed pack 3 or at least one portion of a sealed pack filled with food product, such as pasteurized milk or fruit juice, from a tube 2 of sheet packaging material.

In particular, the following of the present description, without this implying any loss of generality, will make explicit reference to a unit 1 for forming and advancing sealed packs 3 filled with a pourable product.

The packaging material has a multilayer structure (not shown), and comprises a layer of fibrous material, normally paper, covered on both sides with respective layers of heat-seal plastic material, e.g. polyethylene.

In the case of aseptic packages for long-storage products, such as UHT milk, the packaging material also comprises a layer of gas- and light-barrier material, e.g. aluminum foil or ethylene vinyl alcohol (EVOH) film, which is superimposed on a layer of heat-seal plastic material, and is in turn covered with another layer of heat-seal plastic material forming the inner face of the package eventually contacting the food product.

Tube 2 is formed in known manner by longitudinally folding and sealing a web (not shown) of heat-seal sheet material, is filled by a pipe (not shown) with the sterilized or sterile-processed food product for packaging, and is fed, in known manner not shown, along a vertical path having an axis A.

It is also possible to identify:
a direction B, which is orthogonal to axis A and horizontal in the embodiment shown; and
a direction C, which is orthogonal to both axis A and direction B and is horizontal in the embodiment shown.

In greater detail, unit 1 (FIG. 1) comprises a pair of forming assemblies 10a, 10b, which are arranged on opposite lateral sides with respect to axis A and are spaced with respect to one another along direction B, and which are adapted to interact with tube 2, so as to form a number of pillow packs 3 separated from one another. Packs 3 are fed to a not-shown downstream folding unit, in which packs 3 are folded into corresponding not-shown packages.

Forming assemblies 10a, 10b interact with tube 2 to heat seal it at equally spaced cross sections and form a number of packs 3 (FIG. 1) connected to tube 2 by transversal sealing bands crosswise to axis A.

Furthermore, forming assemblies 10a, 10b interact with tube 2 to cut packs 3 along respective sealing bands, so as to separate the pillow pack from one another.

Forming assembly 10a substantially comprises:
a frame 12a, which defines a plurality, two in the embodiment shown, of endless tracks 13a spaced along direction C with respect to one another; and
a plurality of carriages 14a.

Forming assembly 10b substantially comprises:
a frame 12b, which defines a plurality, two in the embodiment shown, of endless tracks 13b spaced along direction C with respect to one another; and
a plurality of carriages 14b.

Carriages 14a, 14b are independently from one another and self-movable on relative tracks 13a, 13b.

Each frame 12a, 12b comprises:
two oval planar end surfaces 16a, 16b opposite to one another and parallel to direction C, lying on respective planes orthogonal to direction C and vertical in the embodiment shown; and
a curved continuous surface 17a, 17b, which extends between surfaces 16a, 16b along direction C.

Surfaces 17a, 17b define respective tracks 13a, 13b.

Furthermore, each track 13a, 13b lies in a vertical plane and comprises (FIG. 1):

a rectilinear portion 18a, 18b, which extends parallel to axis A and faces tube 2;
a rectilinear portion 19a, 19b, which extends parallel to axis A and is opposite to respective portion 18a, 18b; and
a pair of curved portions 20a, 20b, which are interposed between portions 18a, 18b; and 19a, 19b.

Portion 18a, 18b; 19a, 19b are, in the embodiment shown, vertical.

Portions 18a, 18b face one another and are arranged between portions 19a, 19b.

Each carriage 14a of forming assembly 10a is associated to a corresponding carriage 14b of forming assembly 10b.

In the embodiment shown, each carriage 14a and the corresponding carriage 14b form and seal a relative pack 3.

In particular, carriages 14a, 14b comprise respective not-shown half-shells.

Carriage 14a also comprises a not-shown sealing element and a not-shown extractable cutting element.

Carriage 14b also comprises a counter-sealing element and a not-shown seat, which is adapted to receive cutting element, when the latter is extracted.

Carriages 14a, 14b are self-movable on respective tracks 13a, 13b independently from one another.

Each carriage 14a, 14b substantially comprises (FIG. 1):
a motor element 40, which extends parallel to direction C;
a tool 41 (only schematically depicted in FIG. 1), which protrudes laterally on one side of motor element 40, is configured to interact with a relative pack and can move with respect to motor element 40 in order to move the relative pack and/or to carry out an operation on the relative pack.

In the embodiment shown, tools 41 of carriages 14a are provided with respective half-shells for controlling the shape of packs 3 in formation, and with respective sealing elements and respective extractable cutting elements.

Tools 41 of carriage 14b are provided with respective half-shells corresponding to those carried by carriages 14a, and with respective counter-sealing elements adapted to interact with corresponding sealing elements to form transversal sealing bands of packs 3 and respective seats adapted to house corresponding cutting elements when packs 3 are cut along the transversal sealing bands.

Motor element 40 is, in the embodiment shown, magnetically coupled with respective magnetic field sources 42 (FIG. 2) which are carried in fixed position by respective surfaces 17a, 17b, so that carriage 14a, 14b is self-movable along tracks 13a, 13b.

Magnetic field sources 42 can be selectively activated/deactivated on the basis of the operative conditions of unit 1 so that carriages 14a, 14b are movable along tracks 13a, 13b independently from each other.

Advantageously, unit 1 comprises (see, in particular, FIG. 2):
an electromagnetic stationary device 50;
a plurality of tags 52a, 52b carried by respective carriages 14a, 14b; and
wireless communication means 51 configured to establish a bidirectional communication between device 50 and tags 52a, 52b.

Wireless communication means 51 are configured to:
transfer power from device 50 to tags 52a, 52b;
transfer data from device 50 to tags 52a, 52b; and
transfer data from tags 52a, 52b to device 50.

Device 50 is, in the embodiment shown, an antenna or is formed by a plurality of antennas connected to one another.

In particular, device 50 is a wire-antenna.

Device 50 is electromagnetically coupled with tags 52a, 52b.

In the embodiment shown, device 50 is shaped in the same way as tracks 13a, 13b. Accordingly, device 50 is electromagnetically coupled with tags 52a, 52b along the whole tracks 13a, 13b.

Alternatively, device 50 could be shaped as only a portion of tracks 13a, 13b and be electromagnetically coupled with antennas 54a, 54b carried by respective tags 52a, 52b along that portion only of tracks 13a, 13b.

In greater detail, carriages 14a, 14b are provided with respective electric circuits embedded in tags 52a, 52b.

In the embodiment shown, tags 52a, 52b are passive and comprise memory registers.

Device 50 transfers, by means of wireless communication means 51, the power required to operate tags 52a, 52b.

Carriages 14a, 14b comprise, each, at least one respective sensor 53a, 53b which is configured to generate an output signal associated to the operative conditions of carriages 14a, 14b and or unit 1.

In greater detail, sensor 53a, 53b is an accelerometer for measuring the vibrations of carriages 14a, 14b and/or a temperature sensor.

Sensors 53a, 53b comprise respective electrical circuits.

Tags 52a, 52b are functionally coupled with respective sensors 53a, 53b to power their electrical circuits.

Tags 52a, 52b are functionally coupled with respective sensors 53a, 53b to receive the output signals and transmit these output signals to device 50. In other words, the data transferred from tags 52a, 52b to device 50 comprise the output signals of sensors 53a, 53b.

Unit 1 also comprises a personal computer 55, which is connected with device 50 and in which the data transferred from tags 52a, 52b to device 50 are downloaded and displayed.

Personal computer 55 is stationary with respect to carriages 14a, 14b.

More precisely, unit 1 comprises:

an interrogator 56 connected to device 50;

a receiver 57 connected to personal computer 55; and connecting means 58, e.g. an Ethernet cable or a Wi-Fi protocol, which allow the exchange of data between interrogator 56 and receiver 57.

In the embodiment shown, wireless communication means 51 use RFID (Radio Frequency Identification) protocol to establish a communication between device 50 and carriages 14a, 14b. Furthermore, device 50 is a RFID antenna and tags 52a, 52b are RFID tags.

In use, carriages 14a, 14b move along respective tracks 13a, 13b and tube 2 of packaging material is fed parallel to axis A between forming assemblies 10a, 10b.

As carriages 14a, 14b move along respective tracks 13a, 13b, corresponding tools 41 interact with one another and/or with tube 2, so as to form, seal, separate and advance parallel to axis packs 3.

In the embodiment shown, half-shells of tools 41 of carriage 14a, 14b cooperate with one another to control the shape of packs 3 while sealing elements of tools 41 of carriages 14a cooperate with counter-sealing elements of tools 41 of carriages 14b to heat seal tube 2 at equally spaced cross-section and to form respective bottom transversal sealing bands of packs 3.

Furthermore, the cutting elements carried by tools 41 of carriages 14a are extracted up to when they are housed inside seats carried by carriages 14b, so as to cut packs 3 along respective transversal sealing bands and to separate those packs 3 form tube 2.

Wireless communication means 51 transfer power from device 50 to tags 52a, 52b carried by respective carriages 14a, 14b.

Wireless communication means 51 also transfer data from device 50 to tags 52a, 52b and vice-versa.

In particular, the data transferred from device 50 are stored in the memory register of tags 52a, 52b.

Tags 52a, 52b of each carriage 14a, 14b power electrical circuits of respective sensors 53a, 53b carried by same carriage 14a, 14b.

Furthermore, tags 52a, 52b of each carriage 14a, 14b receive output signals from sensors 53a, 53b carried by same carriage 14a, 14b.

These output signals are stored inside the memory registers of tags 52a, 52b and are transferred by means of wireless communication means 51 to device 50.

Device 50 transfers output signal to personal computer 55, in which they are downloaded and displayed.

In particular, the output signals are transferred by connecting means 58 between interrogator 56 connected to device 50 and to receiver 57 connected to the personal computer 55.

The advantages of unit 1 and of the method according to the present invention will be clear from the above description.

In particular, wireless communication means 51 establish a bidirectional communication between device 50 and tags 52a, 52b.

Still more precisely, wireless communication means 51 transfer power from device 50 to tags 52a, 52b and data between device 50 and tags 52a, 52b.

It is therefore possible to operatively connect tags 52a, 52b with sensors 53a, 53b associated to carriages 14a, 14b and, therefore, to monitor in real-time the operation of carriages 14a, 14b and of unit 1.

It is important to stress that the operation of carriages 14a, 14b and unit 1 is carried out in a very simple way, being not necessary to provide a dedicated stationary sensor inside unit 1.

In particular, tags 52a, 52b transfer the power received by device 50 to sensors 53, receive the data relative to the operative condition of carriages 14a, 14b from sensors 53a, 53b and memorize this information. Furthermore, wireless communication means 51 transfer these data from tags 52a, 52b to device 50.

In this way, it is possible, in case sensors 53 are accelerometers, to evaluate the load history of the bearing of carriages 14a, 14b and, therefore, the achieved fatigue level.

In case sensors 53a, 53b are temperature sensors, it is possible to verify whether or not the temperature in the environment of carriages 14a, 14b is correct in relation to the operation to be carried out by tools 41.

Finally, RFID protocol is effective in providing the electrical circuits of tags 52a, 52b with enough power to operate, without generating too heavy electrical load on the electrical circuits of tags 52a, 52b.

Clearly, changes may be made to unit 1 and to the method as described and illustrated herein without, however, departing from the scope defined in the accompanying claims.

In particular, unit 1 could be adapted for applying glue onto opening devices before the gluing of the latter onto the formed and filled and folded packages.

In this application, carriages 14a, 14b would move along a three-dimensional trajectory below a glue applicator, with the purpose of properly applying the glue on the face of the opening devices intended to be glued on the respective packages.

Furthermore, unit 1 could be adapted to direct moulding of plastic to obtain opening devices onto respective holes or so-called "pre-laminated holes" of the web of packaging material. In this case, carriages 14a, 14b would be employed for setting respective molding stations in respective desired positions on the web of packaging material. The molding stations are then operated to mould the opening devices.

The invention claimed is:

1. A unit for forming/advancing at least one portion of a pack, comprising:
    a frame; and
    at least one carriage configured to move along an endless path with respect to the frame and configured to advance the at least one pack portion, the carriage comprising at least one sensor configured to generate an output signal associated with at least one of an acceleration or a temperature of the carriage;
    an electromagnetic stationary antenna;
    at least one RFID tag carried by the carriage, the RFID tag configured to receive the output signal from the sensor and to power the sensor; and
    a communication unit configured to:
        establish wireless bidirectional communication between the electromagnetic stationary antenna and the RFID tag; and
        transfer the output signal from the RFID tag to the electromagnetic stationary antenna,
    wherein the electromagnetic stationary antenna has a shape substantially the same as a shape of the endless path.

2. The unit of claim 1, wherein the communication unit is configured to transfer power from the electromagnetic stationary antenna to the RFID tag.

3. The unit of claim 1, further comprising a display unit configured to receive information from the electromagnetic stationary antenna for display.

4. The unit of claim 1, wherein the communication unit is configured to use radio-frequency identification protocol to establish the bidirectional communication.

5. The unit of claim 1, further comprising:
    a track which carries a plurality of selectively activatable magnetic sources; and
    a plurality of the carriages, each comprising a respective motor magnetically coupled with the respective magnetic source and independently self-movable along the track.

6. A method for advancing at least a pack portion, comprising:
    advancing at least one carriage along an endless path with respect to a stationary frame;
    generating, by a sensor on the carriage, an output signal associated with at least one of an acceleration or a temperature of the carriage, wherein the sensor communicates with an RFID tag carried by the carriage and wherein the sensor is powered by the RFID tag;
    advancing the pack portion by the carriage;
    establishing a wireless bidirectional communication between an electromagnetic stationary antenna and the RFID tag carried by the carriage; and
    transmitting the output signal from the RFID tag to the electromagnetic stationary antenna;
    wherein the electromagnetic stationary antenna has a shape substantially the same as a shape of the endless path.

7. The method of claim 6, further comprising transferring power from the electromagnetic stationary antenna to the RFID tag.

8. The method of claim 6, further comprising:
    powering the sensor by the RFID tag which is powered by the electromagnetic stationary antenna.

9. The method of claim 6, further comprising:
    using a radio-frequency identification protocol to establish the bidirectional communication.

* * * * *